FIG. 1A
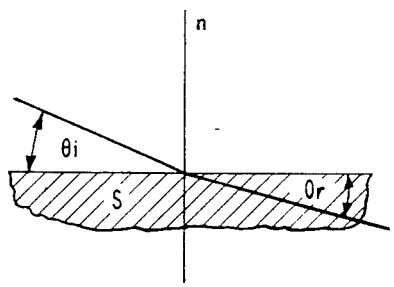
FIG. 1B
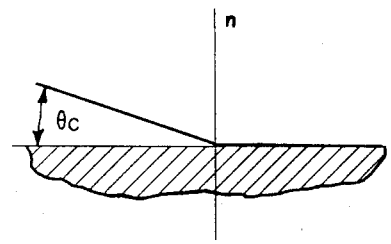
FIG. 1C
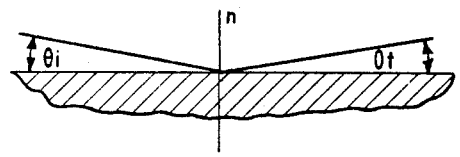
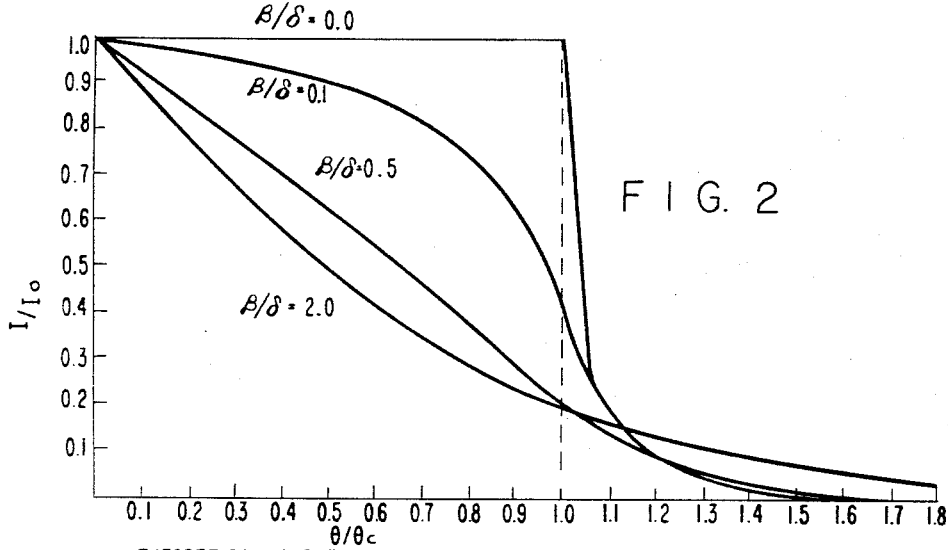
THEORETICAL CURVES SHOWING EFFECT OF ABSORPTION ON THE INTENSITY OF REFLECTION NEAR THE CRITICAL ANGLE $\theta_c$
INVENTOR
HERIBERT KARL JOSEF HERGLOTZ Dec. 24, 1968 H. K. J. HERGLOTZ 3,418,466
X-RAY SPECTROGRAPH APPARATUS USING LOW ANGLE X-RAY
REFLECTING UNITS AND MEANS TO VARY
THE X-RAY INCIDENCE ANGLE
Filed July 18, 1966 4 Sheets-Sheet 2

INVENTOR
HERIBERT KARL JOSEF HERGLOTZ

BY *Harry C. Bradlick*

ATTORNEY

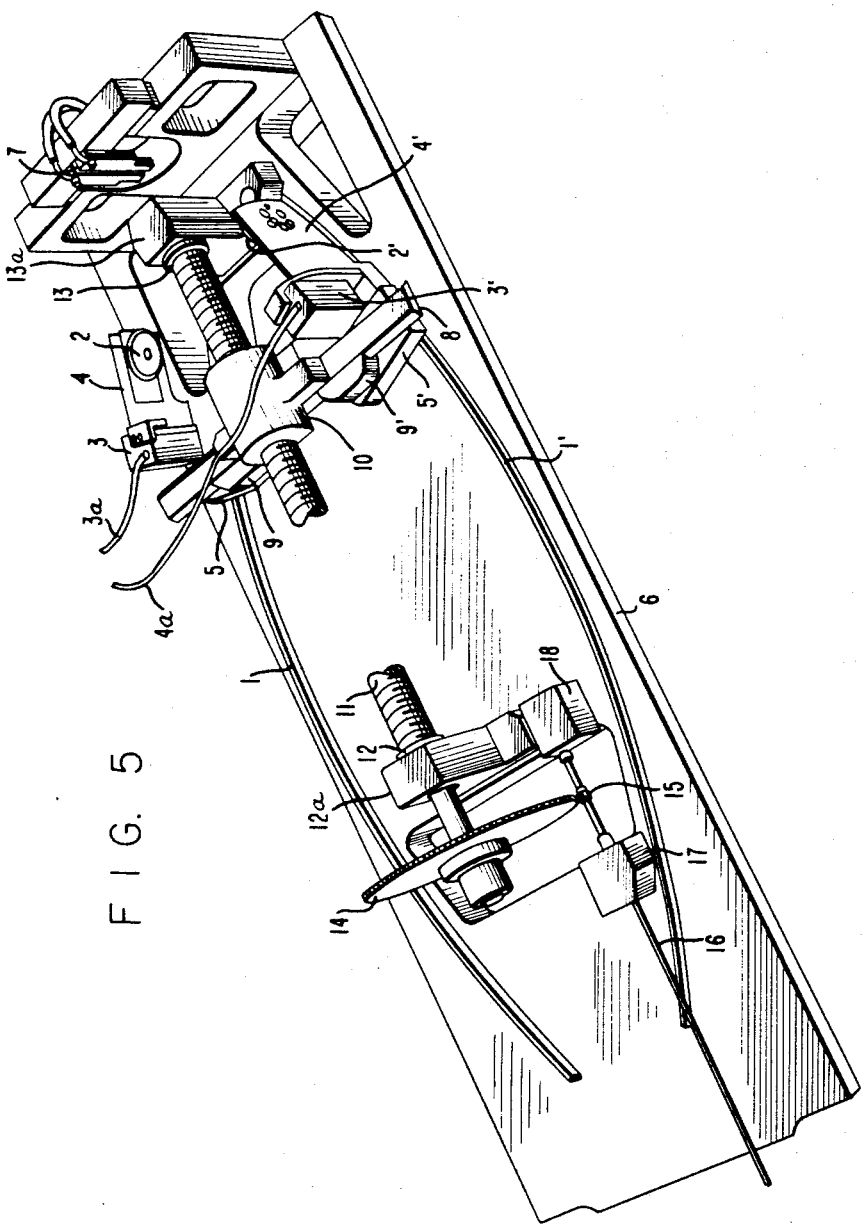

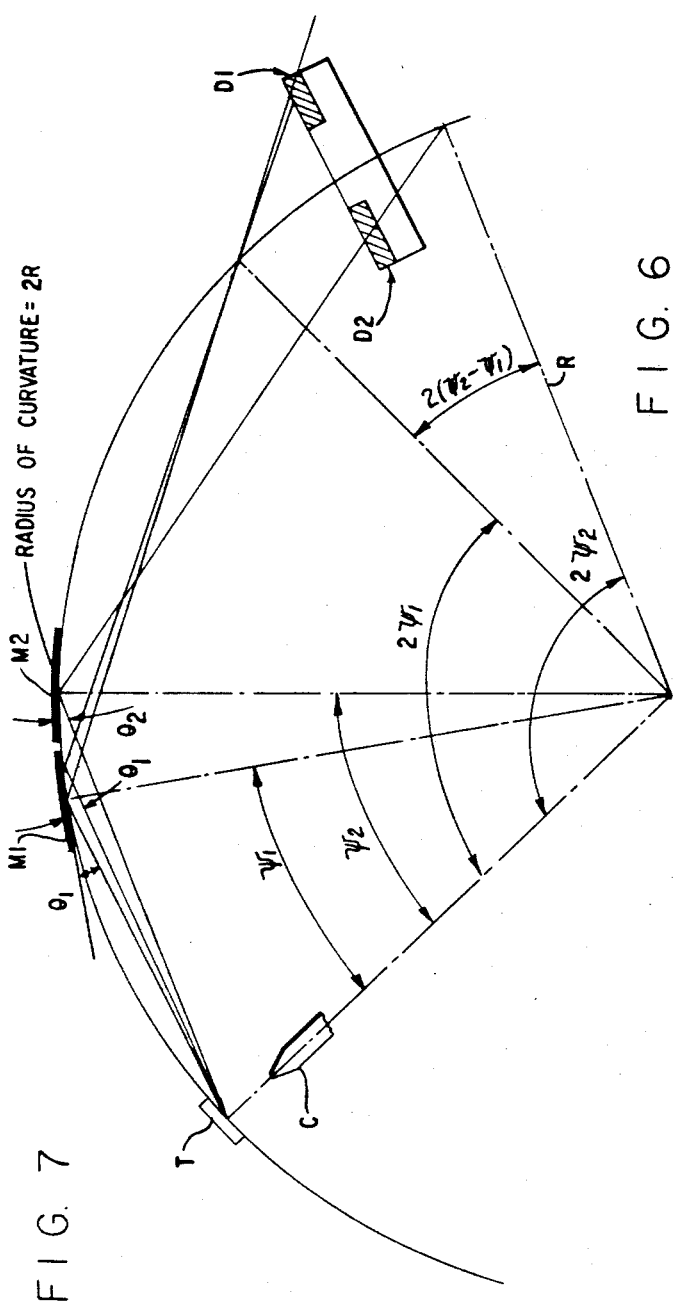
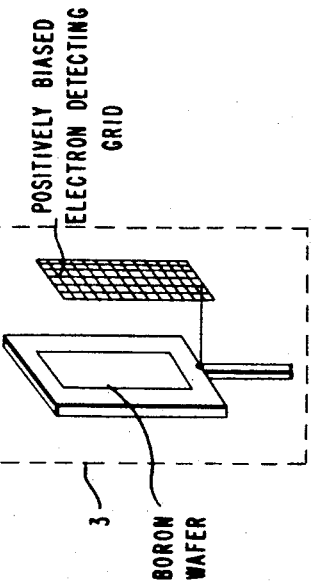

United States Patent Office 3,418,466
Patented Dec. 24, 1968

3,418,466
X-RAY SPECTROGRAPH APPARATUS USING LOW ANGLE X-RAY REFLECTING UNITS AND MEANS TO VARY THE X-RAY INCIDENCE ANGLE
Heribert Karl Josef Herglotz, Wilmington, Del., assignor to E. I. du Pont de Nemours and Company, Wilmington, Del., a corporation of Delaware
Filed July 18, 1966, Ser. No. 566,057
6 Claims. (Cl. 250—49.5)

ABSTRACT OF THE DISCLOSURE

An X-ray spectrograph apparatus comprising an improved reflecting unit with a different critical angle of total reflection for low angle of incidence soft X-ray radiations of elements from beryllium to fluorine in atomic number, the unit comprising a sharply defined exterior reflecting surface formed on a solid member with an essentially pure composition selected from the class consisting of paraffins, polyethylenes, polypropylenes, polystyrenes, and boranes.

---

This invention relates to an improved apparatus for detecting and recording the soft X-ray spectra of solids.

X-rays have been widely used to determine the elemental composition of materials because of their nondestructive nature and their capability for analysis of specimens which are present in extremely minute amounts. Devices developed for the performance of such analyses are commonly known as X-ray spectrographs, and are designed to excite a specimen or sample of the material of interest into producing its characteristic X-rays.

Excitation of a material to produce its characteristic radiation may be accomplished in a number of ways. The specimen may be made the target for high-voltage electrons, which, upon striking the target, lose their energy by knocking electrons out of the target atoms, thereby generating the characteristic line spectrum of the target elements (primary X-rays). The element may also be excited by primary X-radiation from an X-ray tube (fluorescent excitation). For each element, the same energy is required for excitation by fluorescence as for excitation by electrons. Accompanying the characteristic spectrum produced by direct exposure to electrons, however, is a continuous spectrum from those electrons which lose their energy by deceleration in the target material; the characteristic lines are superimposed on this continuous spectrum. There is no continuous spectrum excited by fluorescence radiation because the primary X-rays cannot lose their energy in a continuous fashion analogous to the deceleration of electrons in the X-ray tube target. In either case, the characteristic radiation produced by the element (or elements) in the sample must be detected in order to identify the element (or elements) present. Quantitative analysis of the sample involves comparison of the measured and recorded line intensities with known standards.

In one form of X-ray spectrographic apparatus employed in the art, there is provided between the sample and a suitable radiation detector a crystal which reflects the different wave lengths at different angles in accordance with Bragg's law $$\lambda = 2d \sin \theta$$

where $\lambda$ is the wave length, $d$ the spacing between the lattice planes of the crystals, and $\theta$ the reflection angle. The crystal grating method, however, has its limitations insofar as wave lengths longer than the distance between the atomic layers, say greater than about 10 A., may not be selectively reflected. This is clear from the above equation in which $\lambda$ cannot be larger than $2d$. Thus, since it is the characteristic wave lengths of the low-atomic-numbered elements that are too long for measurement by crystal gratings, a practical limitation exists for the analysis of all elements of atomic number below that of Na. Moreover, X-ray spectrographic analysis of the very low-atomic-numbered elements, such as carbon, oxygen, and nitrogen, is made difficult by the lack of a suitable detector for the "soft" (low energy) X-ray wave lengths emitted by these elements. The characteristic K X-rays from carbon, for example, have a wave length of 43.64 A. (284 electron volts) as compared to 8.5 A. (1559 electron volts) for aluminum, which is the present limit for X-ray fluorescence methods of analysis. Standard X-ray detectors such as Geiger, proportional or scintillation counters cannot be used because these units have windows of plastic or metal foil which are completely opaque to X-rays having a wave length above 10 A.

In the present invention, distinguishing the various long wave lengths associated with the characteristic X-ray spectrum of the excited specimen is based upon the total reflection of an X-ray beam from an improved reflector unit and the utilization of the concept of the critical angle of reflection to provide an effective cut-off limit for all wave lengths whose critical angle, determined relative to a given reflective surface, does not exceed a small angle at which X-rays issuing from the specimen are caused to be incident upon the reflecting surface.

In general terms, a preferred embodiment of the present invention involves an improved X-ray spectrographic apparatus in which interception of the radiation flux issuing from the specimen by a pair of novel improved concave mirrors, or reflector units, mounted so as to present to the flux impinging thereon an incremental and constant difference in their respective angles of incidence with said flux. Beyond a certain cut-off limit, which is distinctive for each mirror depending upon its angular relationship to the path of radiation, all wave lengths issuing from the source will be totally reflected. The incremental angular difference between the mirrors, therefore, provides an intensity difference in the monitored reflected radiation from each mirror which can be recorded and measured. Effective monochromatization is thereby obtained and a range of narrow-wave-length bands can be scanned to produce an X-ray spectrum comparable to that produced by the hereinbefore described crystal apparatus. The improved reflector units for the spectrographic apparatus of the invention gives a different substantially sharp critical angle of total reflection for soft X-ray radiations characteristic of each of the elements from beryllium to fluorine in atomic number, and comprise generally a smooth uniform reflecting surface formed on a mass of at least about 12 microns thickness of a reflecting material rigid and solid at the operating conditions, said material being nonreactive, of low X-ray absorption characteristics, highly stable chemically and formed solely of a plurality of elements having low atomic numbers in the range of from 1 to 6 with the effective atomic number of the composite absorber being between 2 and 5, said surface being formed for example from one or more ingredients selected from the group consisting of high purity paraffins, high purity polyethylenes, high purity polypropylenes, high purity polystyrenes, and high purity boranes, the term effective atomic number of the composite absorber means a number calculated from the composition and atomic numbers of the ingredients which make up the reflecting surface. The formula for this number can be evolved from the well-known law of Bragg-Pierce; i.e., $\mu/\rho = C\overline{N}^3\lambda^3$ where $\mu/\rho$ is the absorption coefficient of the surface material, C is a constant, $\overline{N}$ is the effective atomic number, and $\lambda$ is a wave length.

Accordingly, a principal object of the present invention is to provide an improved reflecting mirror system with novel improved mirrors or reflector units so disposed in the path of incident X-radaition as to satisfy the incidence-angle condition for total reflection and to achieve the measurement of radiation intensity within a narrow-wave-length band.

Another object of the present invention is to provide novel spectrographic apparatus designed primarily for the detection of low-atomic-numbered elements.

A still further object of this invention is to provide apparatus for rapidly and efficiently determining the composition of a sample material containing one or more elements having an atomic number lower than that of Na (11).

Another object is to provide apparatus for use in the spectroscopic analysis of materials containing elements whose characteristic X-rays have long wave lengths and low energy.

Additional objects and advantages will be apparent from a consideration of the following specification and claims taken in conjunction with the accompanying drawings in which:

FIGURES 1A, 1B, and 1C are graphical representations illustrating certain basic principles or definitions in X-ray reflection and refraction.

FIGURE 2 illustrates, in graphical representations, of the variations in intensity of reflected radiation versus the angle of incidence of the radiation, the effect of absorption in the reflecting material or the sharpness with which the critical angle of reflection can be determined.

Figure 3:
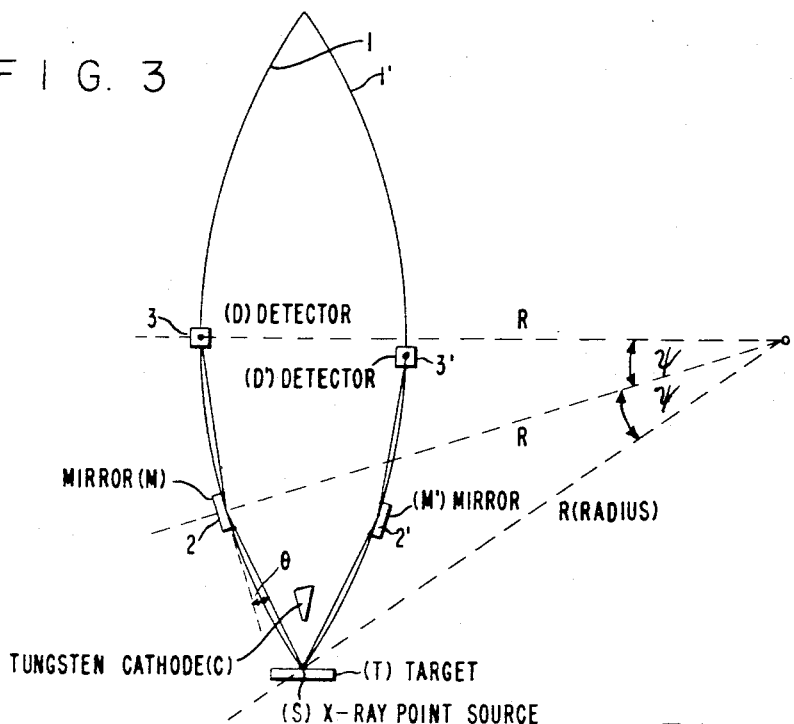
FIGURE 3 is a schematic general view illustrating the general features of a reflection type X-ray spectrograph apparatus embodying features of this invention.
Figure 4A:
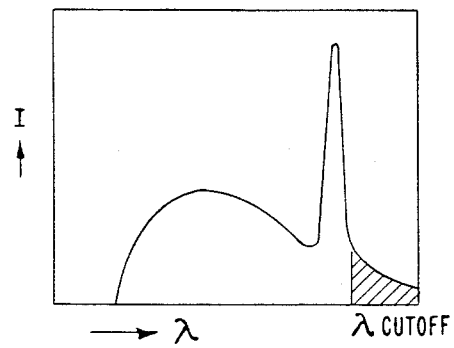
Figure 4B:
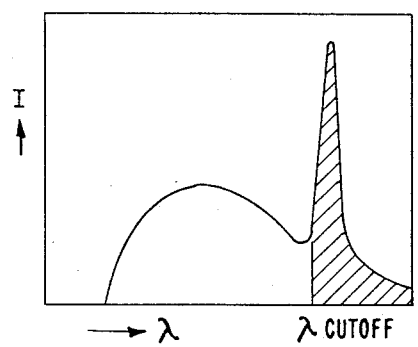
Figure 4C:
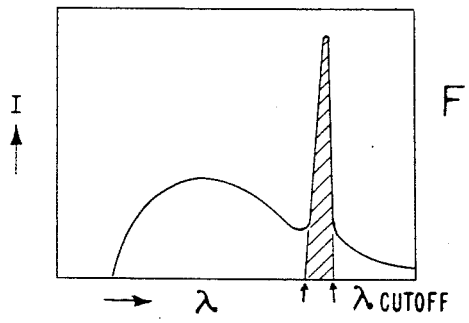

FIGURES 4A, 4B, and 4C illustrate, in graphical representations of variations in the intensity of reflected radiation versus the wave length of the radiation, the general working concept of the improved X-ray spectrograph apparatus shown generally in FIGURE 3.

FIGURE 5 is a partial perspective view of a more detailed combination of components forming a preferred embodiment of the invention corresponding to the general showing of FIGURE 3, certain parts broken away and not shown in order to more clearly show the arrangement of parts.

FIGURE 6 is a general perspective view showing the construction of the detector devices used in the apparatus of FIGURE 5 and FIGURE 7 is a diagrammatic schematic view of an apparatus embodying features of the invention illustrating the general geometrical relationships of the parts with respect to the reflected radiation from a sample.

It is an experimentally verified fact that for X-rays passing from air or vacuum into another material, the index of refraction $n$ is slightly less than 1, by an amount $\delta$ which is of the order of $10^{-6}$ and is a function of $\lambda$; this fact is illustrated in FIGURE 1A, in which the X-ray beam incident on the surface of material S at an angle $\theta_i$ is, upon penetration of this material, reflected away from the surface by an angle $\theta_r < \theta_i$, as would be expected if the waves travel faster in material S. It can be seen, therefrom, progressing from FIGURE 1A through FIGURE 1C, with $\theta_i$ and $\theta_r$, the angles of incidence and refraction, respectively, being measured from the surface, as is conventional with X-ray optics, that at angles $\theta_i$ less than a critical angle $\theta_c$ totally reflected X-rays are obtained externally at an angle $\theta_t = \theta_i$. Referring again to FIGURE 1A, the index of refraction, $n$ is by definition expressible as $$n = \frac{\cos \theta_i}{\cos \theta_r} = 1 - \delta \quad (1)$$

At $$\theta = \theta_c, \; \theta_r = 0 \quad \text{(FIG. 1B)}$$

and $$n = \cos \theta_c = 1 - \delta \quad (2)$$

It can be shown by classical dispersion theory, ignoring absorption of the X-ray beam in the reflecting material, that $\delta$ is given by $$\delta = 1.35 \times 10^{10} \rho \lambda^2 \quad (3)$$

where $\lambda$ = wave length of the incident characteristic radiation and $\rho$ = density of the reflecting material.

Since $\theta_c$ is small, $\cos \theta_c$ in Equation 2 can be expanded as follows, two terms in the expansion being an adequate approximation; vis $$\cos \theta_c = 1 - \frac{\theta_c^2}{2} \quad (4)$$

Therefore $$\theta_c = \sqrt{2\delta} \quad (5)$$

Combining the result of Equation 5 with Equation 3 gives $$\theta_c = K \rho^{\frac{1}{2}} \lambda \quad (6)$$

where K is the lumped product of the constant terms.

The dependence of $\theta_c$ on wave length is clearly seen. It thus appears that analysis for a material having a characteristic wave length $\lambda$ can be performed by measurement of the related critical angle. Equation 6, however, does not take into account the absorption in the reflecting material, which as can be seen in FIGURE 2, determines the sharpness with which the critical angle can be determined from a plot of this sort, sharpness decreasing with increasing absorption. The parameter $\beta$ in this figure is a measure of absorption, $\beta$ being designated the atomic absorption coefficient, and being given by $$\beta = \frac{\lambda}{4\pi} \mu$$

where $\mu$ is the linear absorption coefficient of the reflector. Low values of $\mu$ are therefore necessary to the method of the present invention, as hereinafter described. And, since $\mu/\rho = C\lambda^3 N^3$, the law of Bragg-Pierce, absorption of a given wave length can be decreased only by using an absorbing material of low atomic number, N.

The significance of a low-absorption coefficient to enhanced sharpness of the critical angle has been realized by other researchers in this field. A. Franks and R. F. Braybrook, 10 Brit. Journ. Appl. Phys. 190 (1959), working with a beryllium reflector, made plots of $I/I_0$ vs. glancing angle, in the manner illustrated by FIGURE 2, for the $C_K$ and $O_K$ characteristic radiations ($\lambda = 44.5$ and 23.6 A., respectively) but were unable to obtain critical angles sharp enough to separate these radiations. They also mention the difficulty of performing analyses of mixtures of the lighter elements with their equipment, which used only a single mirror and detector in contrast to the differential method of the present invention. These workers apparently neglected to take into consideration the state of purity of their reflector material. To meet the absorption coefficient requirement, the reflector material used has to be free of heavy-element contamination. Beryllium is generally covered with a surface layer of oxygen, and contains traces of heavy-element contamination. Hyperpure beryllium, with an atomic number of 4, therefore seems to represent a hypothetical condition unachievable in practice. By employing certain materials as the surface of the reflecting units in the apparatus of the present invention, as hereinafter disclosed, this problem has been overcome, making obtainable low-atomic numbered reflecting surfaces of the desired purity and effectiveness.

It has been established that reflecting units with the desired and required different substantially sharp critical angles of total reflection for soft X-ray radiations characteristic of each of the elements from beryllium to fluorine in atomic number can be formed with reflecting surfaces formed on a mass of at least about 12 microns thick of a material rigid and solid at operating conditions, the material being nonreactive, of low X-ray absorption characteristics, highly stable chemically, and formed solely of a plurality of atomic elements having low atomic numbers in the range of from 1 to 6 with the average atomic number value per nucleus of the mass being between 2 and 5. The material preferably should also possess a low X-ray scattering coefficient. Examples of such suitable materials are believed to include high purity hydrocarbons such as paraffins, polyethylenes, polypropylenes, and polystyrenes, with the paraffins being preferred from the standpoint of effectiveness, ease of preparation, and chemical inertness. High purity boranes are also considered to be satisfactory materials on which to form the reflecting surface. The reflecting surfaces can be formed or machined on solid elements of these materials, or uniformly coated upon solid support elements capable of being easily precisely formed, made of materials such as metals or glasses. The reflective surface material can be placed on the support element by any suitable means such as solution coating, or vacuum deposition of vapor on the support element.

Referring now to FIGURE 3, there is shown in schematic form means for producing a spectrographic representation of the intensities of a selected range of wave lengths in a polychromatic beam of long-wave-length X-rays, in accordance with the present invention. Mounted in movable fashion, as will be more fully described hereinafter, upon arcuate tracks 1 and 1' are two concave reflecting units having reflecting surfaces 2 and 2' of the specified material. There is also provided a pair of detectors in the form of photodiodes 3 and 3', respectively, intercepting radiation reflected from mirrors 2 and 2'. The reference letter T indicates an X-ray target (or sample) which is irradiated by a beam of electrons from tungsten cathode C, which radiation excites the elements constituting the target T into generating their characteristic radiation in all directions therefrom. Care must be exercised to avoid the deposition of tungsten on the target. It is presumed for the purposes of this description that the target T contains one or more elements in the second period of the periodic table, which elements thus produce characteristic K-radiations which are ultrasoft in character. For example, typical wave lengths for these radiations lie in the range of about 10 to 100 A. The reflecting units or mirrors, M and M' are positioned so as to receive a beam of the fluorescent X-radiation generated by target T, and the radii of curvature of these reflecting surfaces and tracks 1 and 1' are in accordance with physical requirements hereinafter described to produce an astigmatic image of X-ray point source S at the detectors 3 and 3'.

Referring to FIGURE 3, the center of the focusing circle of which rail 1 is an arc is located at O. If the radius of this circle is R, and angle SOM is $\psi$, it is easily shown that the angle of incidence between the line MS and the tangent at M is equal to $\psi/2$. Moreover, for the image of point source S to be located at D on this circle, it can be shown that mirror M must be curved to a radius equal to 2R.

The images at D and D' are produced by total external reflection, and such reflection occurs only for those rays which are incident upon the reflecting surfaces M and M' at angles less than the respective critical angles for the included wave lengths. Rays that fall upon the reflecting surfaces at greater angles will penetrate into the surfaces, and will not contribute to the formation of the reflected image. Conversely, in accordance with Equation 6, a critical angle is defined for each wave length such that all wave lengths whose critical angles on the material of mirrors M and M' are greater than the incidence angle, at any given instant in the traverse of M and M' along 1 and 1', will be totally reflected and their intensities measured by detectors D and D'.

In FIGURE 4A therefore, in which the profile of the radiation produced by a typical target is outlined, $\lambda$ cut-off will be determined by the angle of incidence of mirror M at a given instant, all wave lengths having critical angles greater than $\theta_i$ being totally reflected and their integrated intensities being registered on detector D. A decrease in incidence angle will cause $\lambda$ cut-off to move in the direction of the harder wave lengths. The second concave reflecting surface M' is positioned on rail 1' opposite reflecting surface M such that the respective incidence angles $\theta$ and $\theta'$ differ by an incremental amount which is maintained constantly throughout the complete traverse of both mirrors along rails 1 and 1'. If, for example, radiation from target T is incident on mirror M' at an angle which is slightly less than the incidence angle on M, the energy transmitted to detector D' will include radiation from some additional wave lengths whose critical angles lie intermediate of the two angles $\theta$ and $\theta'$, and the total reflection attributable to M' will be shown in the shaded portion of FIGURE 4B.

It will be clear then that scanning mirror-detector assemblies MD and M'D' over the spectrum of radiation emitted from target T, maintaining a fixed incremental angular relationship between the two mirrors, as hereinbefore described, will produce a resultant difference signal, the intensity of which varies with the difference in the energy totally reflected by the two mirrors, and this difference occurs over the incremental narrow band of wave lengths which is totally reflected by the mirror having the lower angle of incidence, as is illustrated in FIGURE 4C. It will be realized from the foregoing description that discrete glancing angles of incidence are necessary to the successful operation of this invention.

Referring now to FIGURE 5, there is shown in perspective view one embodiment of the present invention as schematically typified in FIGURE 3. The necessary vacuum enclosure and X-ray source are shown schematically. Retained within their respective holders are the special concave reflecting units 2 and 2' having their reflecting surfaces defined by a means of high purity paraffin, and detectors 3 and 3'. The mirrors and detectors in each set are physically attached in that they move as a unit. The mirrors are so disposed that their primary axes are normal to rails 1 and 1', said axes intersecting to define a plane the extension of which passes through the cathodes of detectors 3 and 3', as well as the target material (not visible in this view). Mirror-detector mount 4 abuts and is attached to crab 5, traversably gripping rail 1 with the aid of spring-loaded rollers on its underside. In the construction shown, the bed 6 consists of two machined or cast sections fitted together to form a single body. The mechanism for moving mirror-detector units 4 and 4' away from cathode mount 7 uniformly and in substantially even relationship transverse the bed length, with the hereinbefore differential angular relationship between the two units precisely preserved, consists of yoke 8 slidably dovetailed to turrets 9 and 9', which, in turn, are rotatably pivoted on traversable crabs 5 and 5'. Driving nut 10, preferably made of a carbon-impregnated polyfluorinated plastic is fastened to yoke 8 with spring-loaded Allen cap screws, being threadably engaged with screw 11, which, in turn, is supported at its ends by combination sleeve and thrust bearings 12 and 13, also preferably made of carbon-impregnated polyfluorinated plastic pressed to form pillow blocks 12a and 13a. In operation, screw 11 (about 11 threads per inch) is turned at 1.0–8.0 r.p.m. by gear 14, which meshes with pinion gear 15 on shaft 16, turning at 10–60 r.p.m. Shaft 16 rotates in bearings 17 and 18, being actuated by motor means (not shown) magnetically coupled through the vacuum-tight enclosure (not shown) used with this spectrograph.

Detectors 3 and 3' comprise a pair of photodiodes which via leads 3a and 4a are connected in a conventional phototube bridge to give an indication of the resultant differential intensity. Ordinarily, because of the high intensity of the signals received by the phototubes, no amplification is required. In operation, high voltage is applied directly to the filament-cathode C via these leads and after circulation of cooling water to the grounded target anode (not shown) is started. A typical operating condition for X-ray excitation is 3 kv. at 1 ma.

Radiation impinging on the photocathodes of either detector causes the emission of electrons therefrom in proportion to the energy of totally reflected X-rays, assuming (a) that only radiation reflected from the mirror alone reaches the photo-detector, and (b) that current flowing tthrough the measuring circuit including the detector is produced entirely by electrons removed from the photocathode. Shielding (not shown) is employed, therefore, between the mirror and detector to eliminate stray radiation. Proper biasing of the detector measuring circuit can be employed to insure requirement (b) above. The detector construction is as shown in FIGURE 6, a boron wafer being used as a photocathode, with a fine, nearly shadowless grid well isolated from the boron wafer serving as anode. The open-window photodiode housing 3 is made of a suitable material such as Permalloy. X-rays impinging on the wafer through the grid will knock out electrons which will then flow to the grid. Visible light will be eliminated by virtue of the fact that the work function of boron is higher than the $h_v$ of visible light. The work function of a material is an indication of the energy required to extract electrons therefrom.

It will be readily apparent to one skilled in the art of X-ray analysis that the differential measurement obtained with the double-railed instrument of FIGURES 3 and 5 can also be made with an instrument with a single rail 1 fitted with a source T, C, two spherical mirrors $M_1$ and $M_2$, and two closely spaced detectors $D_1$ and $D_2$. A divergent beam received on each of the two spherical mirrors at grazing incidence is focused into two images on the rail 1. The angle of incidence differs slightly between the two mirrors (see FIGURE 7); the short wave length limit for total reflection, being dependent on incidence angle, differs also. The differential output of the two radiation detectors placed in the reflected beam measures the energy in a narrow-wave-length interval, as hereinbefore described for the double-railed instrument. A mechanically coupled variation in the positions of both the reflectors and the pair of detectors varies the observed wavelength. A signal picked up from either one of the reflected beams, therefore, represents a different wave length distribution, the difference being representative of $d\lambda$, by which the critical wave length of total reflection differs between the two reflectors. The dual focusing reflectors would preferably have a polyethylene or paraffin reflecting surface. The detectors used could be of the solid-state design embodied in the legs of a bridge circuit to obtain a differential output signal. Still another embodiment would make use of a single detector followed by an electronic differentiating circuit. A difference signal could also be obtained in a one-rail, one-detector embodiment by storing the intensity signal on magnetic tape during traverse followed by playback through a dual-head device to give two signals for obtaining a differential recording. Many other shapes of reflectors can be envisioned with continuously or stepwise varying incidence angles. For example, flat, cone-shaped cylindrical surfaces could be used to obtain a variety of incidence angles without making use of moving parts. Mirror or reflecting unit alignment is quite critical also and must be done with considerable care in order to get reproducible results. Target positioning is also quite critical. In an operating check of a preferred embodiment each of the differential electric readout detectors 3 and 3' were replaced with film holders for conventional X-ray film. A graphite target was used at T. The critical angle for carbon can be calculated by known methods to occur between 3.5° and 4.5°. Therefore, the two reflector units 2 and 2' with paraffin reflecting surfaces were set in such a way that the incident angle on one is 3.5° and on the other 4.5°. Thus, one reflector unit should reflect the carbon radiation nearly fully; the other reflector unit not reflect it at all. The image of a point source formed by a spherical mirror under these conditions is a line. The reflector units and film holders were adjusted by use of visible light. The apparatus was then inserted into a vacuum vessel, pumped down to $2 \times 10^{-5}$ mm. Hg and filament heating and plate voltage switched on. The plate voltage was slowly raised to 1500 v. After a total exposure time of 5 min. the film was developed, and the film exposed at an incident angle of 3.5° showed a definite line, indicative of the carbon $K_a$ radiation. The film sample exposed at the 4.5° incidence angle showed no evidence of a line, providing assurance that the instrument had, in effect, experienced the differential region in which the critical angle for carbon occurs. This result can be interpreted as an analysis of the target material for carbon. As further verification of this result, the position of the reflector units was interchanged, i.e., the unit originally set at 3.5° was moved to 4.5°, and vice versa. The results again confirmed the presence of carbon, with a line appearing quite strongly on the film sample exposed at the 3.5° incidence angle.

It is apparent that an improved apparatus has been provided in accordance with the objects of the invention.

Although a preferred embodiment has been disclosed in detail, modifications and variations within the spirit of the invention will occur to those skilled in the art, and all such are intended to fall within the scope of the following claims.

I claim:

1. An improved X-ray spectrograph apparatus for detecting the characteristic soft X-ray radiations of elements from beryllium to fluorine in atomic number, said apparatus comprising in combination; a fluid tight casing operative to define and maintain a zone of high vacuum, positioning means mounted in said casing for receiving and supporting a sample in a given position, sample activating means cooperating with said casing and adjacent said given position, said activating means constructed and arranged to cooperate with a sample at said given position to cause the material contained in such a sample to emit its characteristic X-ray radiation, detector means mounted in said casing and constructed and arranged to receive characteristic X-ray radiation from a sample at said given position and generate an indication corresponding to the intensity of received radiation, reflector means mounted in said casing between said positioning means and said detector means, said reflector means exhibiting a different substantially sharply defined critical angle of total reflecton for low angle of incidence soft X-ray radiation of elements from beryllium to fluorine in atomic number said reflector means positioned, constructed and arranged to receive radiation from a sample at said given position at low angles of incidence and direct such radiation, as may be reflected therefrom, to impinge on said detector means, said reflector means being movably mounted in said casing to vary the angle of incidence of radiation therefrom, adjusting means cooperating with said casing and said reflector means to selectively position the reflector means at various angles to incident radiation from a sample at said given position, said apparatus further comprising means for indicating, for any small angle of incidence of radiation from a sample, the intensity of such radiation and the range of the angles of incidence over which the critical drop in reflected radiation occurs in order to permit identification of the sample material producing the radiation, said reflector means comprising a high efficiency reflector unit for total reflection of low angle incidence X-ray radiations in the wavelength range from about 10 angstroms to about 100 angstroms, said unit comprising a smooth uniform reflecting surface precisely formed on a mass of at least about 12 microns thickness of a reflecting material rigid and solid at operating temperature and pressure conditions, said material being nonreactive, of low X-ray absorption characteristics, highly stable chemically, and formed solely of a plurality of atomic elements having low atomic numbers in the range of from 1 to 6 with the average atomic number value per nucleus of the mass being between 2 and 5.

2. The improved apparatus of claim 1 in which said reflecting material possesses in addition a low X-ray scattering coefficient.

3. The improved apparatus of claim 2 in which said reflecting material is a pure hydrocarbon.

4. The improved apparatus of claim 2 in which said reflecting material is a combination of one or more ingredients selected from the group consisting of high purity paraffins, high purity polyethylenes, high purity polypropylenes, high purity polystyrenes, and high purity boranes.

5. The improved apparatus of claim 4 in which said detector means produces a signal corresponding to the change in intensity of the reflected radiation over a very narrow range of the angles of incidence in order to detect the critical drop in intensity of the reflected radiation as the angle of incidence is varied.

6. The improved apparatus of claim 5 in which said reflector means comprises a second high efficiency reflector unit similar to said reflector unit and movable therewith, said second unit having a reflecting surface positioned at a slight angle with respect to the reflecting surface of said unit and positioned between a sample at said given position and a second detector means such that said detecting means simultaneously indicate the intensity of radiation from a sample at two different angles of incidence on the surfaces of said reflector units.

References Cited

UNITED STATES PATENTS 2,653,249    9/1953    Harker _____ 250—51.5 X

OTHER REFERENCES

"Reflection Coefficients of Radiation in the Wavelength Range From 23.6 to 113 A. for a Number of Elements and Substances and the Determination of the Refractive Index and Absorption Coefficient," by A. P. Lukirskii et al., "Optics and Spectroscopy," vol. XVI, No. 2, February 1964, pp. 168 to 172.

WILLIAM F. LINDQUIST, *Primary Examiner.*

U.S. Cl. X.R.

250—51.5, 105